May 20, 1930. R. W. PATTEN ET AL 1,759,757
CAR UNLOADING DEVICE
Filed April 5, 1928   2 Sheets-Sheet 2
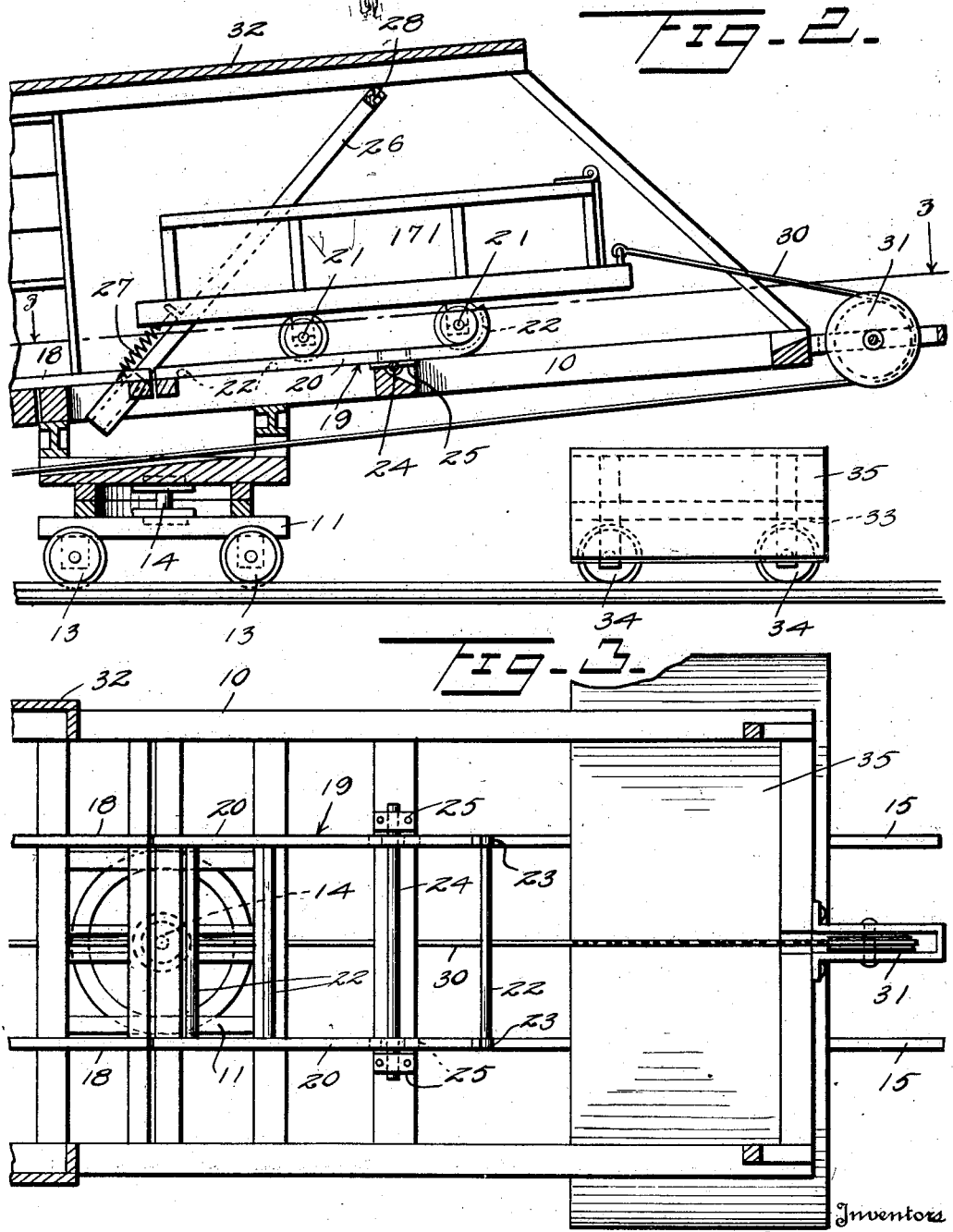

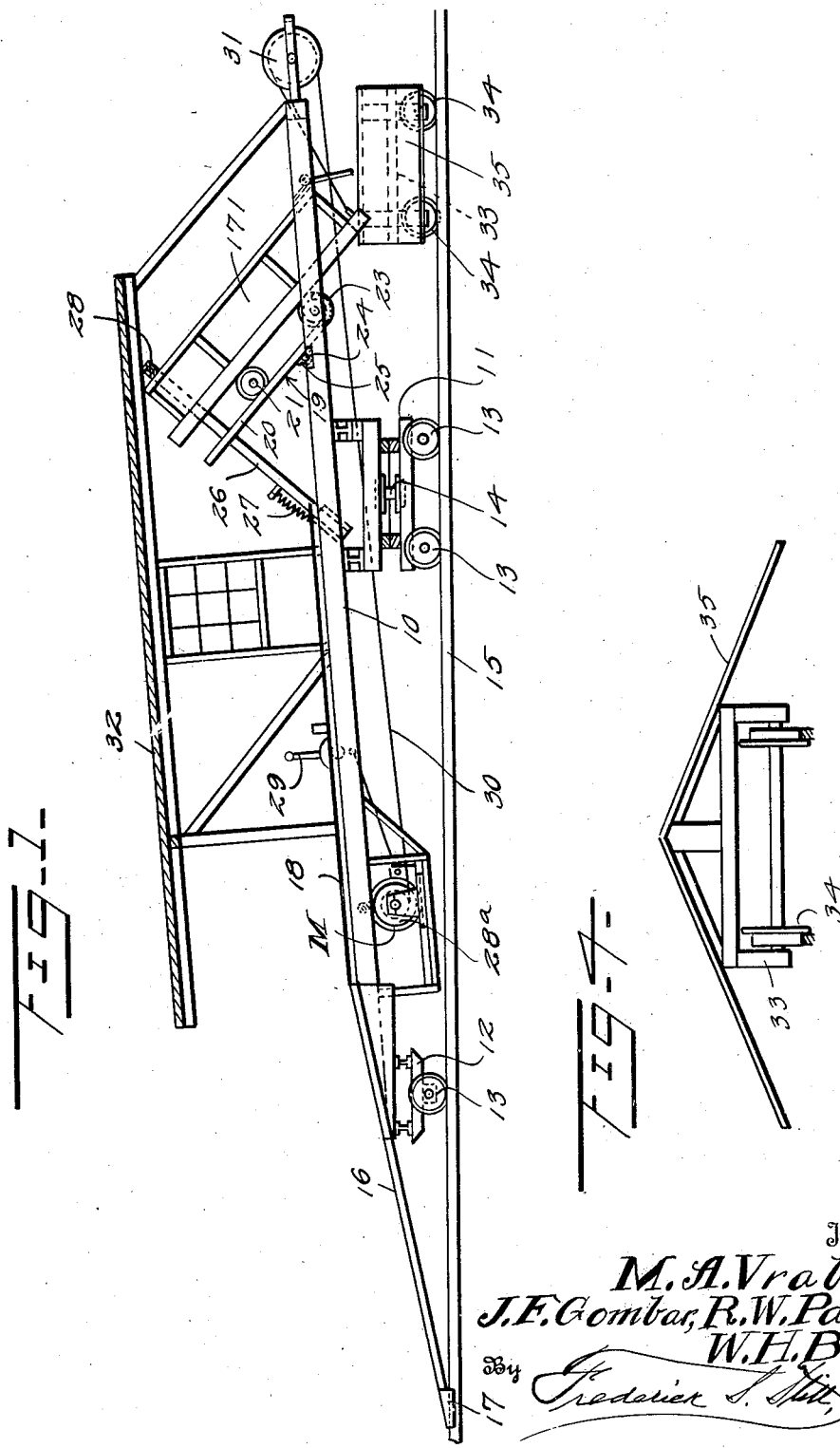

Patented May 20, 1930

1,759,757

UNITED STATES PATENT OFFICE

RALPH W. PATTEN, OF OLYPHANT, MICHAEL A. VRABEL AND JOHN F. GOMBAR, OF THROOP, AND WILLIAM H. BELL, OF CLARKS SUMMIT, PENNSYLVANIA

CAR-UNLOADING DEVICE

Application filed April 5, 1928. Serial No. 267,770.

This invention relates to car unloading devices and more particularly to a device especially adapted for unloading mine cars and the like at a dump.

At the dumps of an active mine, a great many cars must be unloaded in the course of a single day. These cars being heavily loaded with rubble and other refuse from the mine offer considerable problem in unloading. Previous unloading devices with which we are familiar have been of such character that the unloading device itself was either subjected to a severe shock when the car arrived at its destination or was subjected to the shock of a falling load when the car was dumped or to both of these shocks. Accordingly, an important object of this invention is the provision of a device of this character where the shocks of checking both the forward movement of the car and of the falling load are prevented or reduced to such a point that they are negligible.

A further object of the invention is to provide a device of this character having means whereby the discharged load may be spread to opposite sides of the right-of-way over which the car is moved, thereby considerably minimizing the labor necessary in the spreading operation.

A still further object of the invention is to produce a car unloading device of this character which is portable and may be readily secured in any new position to which it is moved and which embodies structure enabling it to provide its own motive power in such movements.

These and other objects we attain by the construction shown in the accompanying drawings, wherein for the purpose of illustration is shown a preferred embodiment of our invention and wherein:—

Figure 1 is a side elevation of a car unloading device constructed in accordance with our invention;

Figure 2 is a detail sectional view therethrough;

Figure 3 is a section on the line 3—3 of Figure 2;

Figure 4 is a detail front elevation of the spreader.

Referring now more particularly to the drawings, the numeral 10 generally designates a main frame supported adjacent its opposite ends by trucks 11 and 12 having track engaging wheels 13. One of these trucks is swiveled, as indicated at 14, to facilitate movement of the frame over the right-of-way 15. The frame 10 inclines from end to end and at its forward or receiving end supports inclined main rails 16, the lower ends of which are provided with rail clamps 17, whereby they may be secured to the rails of the right-of-way to provide continuations thereof over which a car 171 moving over the right-of-way may rise to tracks 18 carried by the platform.

One end of the frame embodies a pivoted platform, generally designated at 19, and comprising rail sections or tipple rails 20 for the reception of the wheels 21 of the car 171 and rigidly connected to one another, as indicated at 22. These rail sections at one end have upwardly extending arcuately curved portions 23 adapted to act as wheel stops engaging the forward wheels of the car to check forward movement thereof. This platform has secured thereto a shaft 24 operating in bearings 25 carried by the frame, these bearings being so located that a car, when disposed upon the platform and engaged with the wheel stops 23, has its center of gravity lying approximately vertically above this shaft.

Associated with this platform is a bumper member for limiting oscillation of the platform with the car thereon. This bumper member comprises a U-shaped element 26 straddling the platform at the forward end thereof and having its legs guided by the frame 10 for limited movement in the general plane of the member. This movement is resisted by a cushioning device, such as a spring 27. The cross bar 28 of the U-shaped member engages the car 171 when the platform is tilted a predetermined distance and limits this tilting movement.

Supported by the frame 10 is a suitable cable reel 28ª operated by a motor M or other suitable source of power. This cable reel is controlled from the platform, as indicated at 29, and has wound thereon a cable 30 extending to the rear of the frame beneath the frame and at the rear of the frame, passing over a sheave 31 to the upper surface of the frame. This cable and the car 171 are provided with coacting means for connecting the same and the level of this connection at the moment when the car engages the wheel stops 23 lies above a line drawn from the upper surface of the periphery of the sheave to said wheel stops, so that a further pull upon the cable at this time will cause the upper end of the car to be moved downwardly, starting a tilting motion of the platform and throwing the center of gravity of the car to the rear of the pivot, so that this tilting motion will continue until movement of the car is checked by the cross bar 28. When the dumping operation is completed, the car has a tendency to remain in this position, due to the fact that the center of gravity will still lie rearwardly of the pivot. At this time, however, the point of connection of the cable with the car lies below a line connecting the upper periphery of the drum and the wheel stops, so that a pull upon the cable will result in the rear end of the car being elevated. This pull provides an initial impulse, sufficient to cause the car to return to its normal position. The swinging motion tends to start the movement of the car along the tracks of the platform, so that it passes from these tracks to the tracks of the frame and so down the tracks 16 to the tracks of the right-of-way. The frame 10 preferably supports a housing 32, providing shelter for the operators.

In order to prevent the load of the car from being deposited directly upon the tracks of the right-of-way and, at the same time, avoid the necessity for an apron attached to the frame upon which this load may be discharged and which will transmit the shock of the discharge to the frame, we provide a body 33 having supporting wheels 34 for engagement with the right-of-way. Supported by this body is an inverted V-shaped spreader 35, the apex of which is arranged at the substantial center of the body and the legs of which extend transversely of the right-of-way. This body is positioned with relation to the frame, so that it will receive the load passing from a car 171 which is being dumped and the spreader 35 will deflect the load well to the sides of the right-of-way. Either the frame or body 35 may be readily shifted to any given point as this becomes necessary. In shifting the main frame, the cable 30 may be brought into play by connecting the same to a cross tie of the right-of-way at a point toward which the machine is to be moved.

Since the construction hereinbefore set forth is capable of a certain range of change and modification without materially departing from the spirit of the invention, we do not limit ourselves to such specific structure except as hereinafter claimed.

We claim:

In a car unloader, a frame, upwardly and forwardly inclined main rails secured to the frame, upwardly and forwardly inclined tipple rails resting upon and pivoted to the frame, stops carried by the tipple rails and adapted to engage the wheels of the car when the center of gravity thereof is substantially alined with the pivot of the tipple rails, a guide sheave mounted on the frame for rotation about an axis alined with and located forwardly beyond the pivot of the tipple rails, a cable passing over the sheave and adapted to be engaged with the car, a U-shaped bumper member arranged in an upwardly and forwardly inclined position with its cross bar extending over and above the car and having its legs slidably connected to the frame to permit the member to move for a limited distance in the direction of its general plane, and springs connected to the frame and legs of the member to yieldingly resist the movement of the member under the influence of the car.

In testimony whereof we affix our signatures.

RALPH W. PATTEN
MICHAEL A. VRABEL.
JOHN F. GOMBAR.
WILLIAM H. BELL.